United States Patent Office

2,851,460
MORPHOLINO COMPOUNDS HAVING ANTI-SPASMODIC PROPERTIES

Harold H. Bryant, Brooklandville, and Lloyd Crosser Felton, Cockeysville, Md., assignors to Hynson, Westcott & Dunning, Incorporated, a corporation of Maryland No Drawing. Application August 20, 1956
Serial No. 605,200

3 Claims. (Cl. 260—247.7)

This invention relates to a group of morpholino compounds which exhibit antispasmodic properties with respect to the stomach while being without significant effect upon intestinal activity. This is an unexpected combination of properties because it appears that analogous antispasmodic compounds generally affect both the stomach and the intestines.

The compounds of the present invention are embraced by the following general formula A
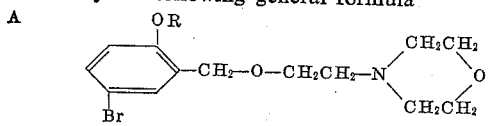

in which R is an alkyl group having from 3 to 5 carbon atoms.

These compounds may be prepared by reacting the alkali metal salt of the appropriate morpholino alcohol with the appropriate compound of the formula

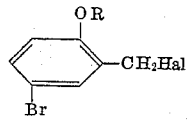

in which R has the meaning stated above.

The method of making the compounds is illustrated by the following specific example.

N-morpholino, 2-(5-brom-2-amyloxybenzyloxy) ethylamine 65 g. of hydroxyethylmorpholine in 500 cc. of xylene were refluxed for eight hours with 20 g. of metallic sodium. The excess sodium was removed at this point and 90 g. of 5-brom-2-amyloxybenzyl bromide in 200 cc. of xylene were added dropwise over 15 minutes with stirring. The mixture was stirred under reflux for 1 hour more and then cooled. The cooled xylene solution was washed several times with water and then extracted with 200 cc. of concentrated hydrochloric acid. The equeous acid extract was washed three times with ether and the resulting ether extract was made alkaline with sodium hydroxide. The resulting ether solution was diluted with ether and washed several times with water. The ether layer was concentrated to small volume and distilled in vacuo. Boiling point 220–225°/2 mm. Dry HCl gas was bubbled into the ether solution of this distillate to prepare the hydrochloride. The resulting crystals were filtered and recrystallized twice from a mixture of methanol and ether. Melting point 99–101° C.

The novel combination of properties of the three compounds covered by the formula A above was discovered in the course of a series of tests to determine the antispasmodic properties of compounds of the general formula B
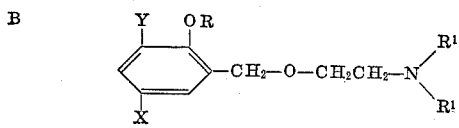

in which R represents an alkyl group containing from 1 to 7 carbon atoms, the $R^1$'s represent alkyl groups containing from 1 to 4 carbon atoms or the group

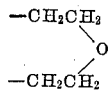

and X and Y represents H, Cl and Br.

These tests showed that the three morpholino compounds covered by formula A above, of all of the numerous compounds tested, exhibited the unique combination of properties referred to above i. e. antispasmodic action with respect to the stomach but not with respect to the intestine.

The compounds were tested according to the published method of Stickney, Van Liere and Northrop. A group of compounds was first tested to determine their effect upon intestinal motility of mice by comparing the rate of progress of a standard charcoal meal through the intestines of mice after the administration of a selected dose of each compound with the normal rate of progress of said charcoal mixture. Since the procedure followed is described in the published literature it need not be described here. The dosage of each compound was 100 mg. per kg. of body weight. Control animals were given 0.025 cc. of 0.85% sodium chloride solution per gram of body weight. The time allowed for drug absorption before administering the charcoal meal was 30 minutes. The charcoal meal composition was made to contain charcoal, acacia and sodium chloride in the following ratio: 5 grams of carbon black, 5 grams of acacia and 90 cc. of 0.85% sodium chloride solution. The amount of this composition administered to each mouse was 0.25 cc. The period allowed for the passage of the charcoal meal compositoin through the intestine was 10 minutes. The normal average rate of movement of the charcoal meal through the intestine in non-drugged mice was determined to be 53% of the total length of the intestine in 10 minutes. The results of the tests of some of the compounds tested are shown in the following table. For convenience the group

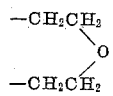

is represented in the table by the letter Z.

Table I

| | Compound | | | | Percent intestine traversed | Percent reduction |
|---|---|---|---|---|---|---|
| | R | X | Y | $R_1$ | | |
| 1 | —$C_3H_7$ | Br | H | —$C_2H_5$ | 34.3 | 35.3 |
| 2 | —$C_3H_7$ | Br | H | Z | 49.1 | 7.4 |
| 3 | —$C_4H_9$ | Br | H | —$C_2H_5$ | 36.6 | 31.0 |
| 4 | —$C_4H_9$ | Br | H | Z | 52.7 | 0.00 |
| 5 | —$C_5H_{11}$ | Br | H | —$C_2H_5$ | 23.1 | 56.5 |
| 6 | —$C_5H_{11}$ | Br | H | Z | 56.9 | 0.00 |

In the foregoing table we have selected for comparison the three morpholino compounds covered by Formula A and the three structurally most closely related dialkyl amino compounds. As appears from the table the morpholino compounds 2, 4 and 6 have substantially no antispasmodic activity to the mouse intestine while the corresponding dialkyl amino compounds 1, 3 and 5 give over 30% reduction in intestinal activity.

Tests similar to those described above were carried out on rats but in these rat tests not only the activity of the intestine but also the activity of the stomach was measured, the latter by measuring the amount of charcoal mixture left in the stomach after a measured period of time following the administration of the compounds tested. It was found that in the control (non-drugged) rats the charcoal mixture traversed 60.5% (average) of the rat intestine and that 27% of the charcoal mixture remained in the stomach. The results of the above described tests are shown in the following table, the group

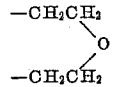

being represented by Z.

Table II

| Compound | | | | Percent Charcoal Retained | Percent Increase Charcoal Retained |
|---|---|---|---|---|---|
| R | X | Y | $R^1$ | | |
| 1 | $-C_3H_7$ | Br | H | $-C_2H_5$ | 87.5 | 224.0 |
| 2 | $-C_3H_7$ | Br | H | Z | 46.7 | 73.0 |
| 3 | $-C_4H_9$ | Br | H | $-C_2H_5$ | 82.0 | 202.0 |
| 4 | $-C_4H_9$ | Br | H | Z | 87.8 | 225.0 |
| 5 | $-C_5H_{11}$ | Br | H | $-C_2H_5$ | 98.5 | 264.0 |
| 6 | $-C_5H_{11}$ | Br | H | Z | 82.5 | 205.0 |

It appears from the data shown in Tables I and II that there is a relaxing effect upon intestinal activity which is independent of the relaxing effect on the stomach. This follows from the fact that some of the compounds tested are antispasmodic to both stomach and intestines while others are effective to the stomach only.

When it is considered that the major portion of ulcers of the gastrointestinal tract which become carcinogenic are located in the stomach the significance of the activity of the compounds as antispasmodics to the muscles of the stomach is apparent.

The compounds of the present invention were found to give a greater antispasmodic effect than an equivalent dose of atropine sulfate and no mydriatic effects are produced by 160 mg./kg. dosages of said compounds. These observations show the value or utility of said compounds as antispasmodics.

The effects of the compounds shown in Table II on the intestines of rats is shown in the following Table III. In this table the group

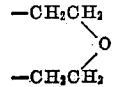

is represented by the letter Z. The average percent of intestine traversed in the non-drugged rats was 60.54%.

Table III

| Compound | | | | Percent intestine traversed | Percent reduction in travel |
|---|---|---|---|---|---|
| R | X | Y | $R^1$ | | |
| 1 | $-C_3H_7$ | Br | H | $-C_2H_5$ | 11.9 | 80.4 |
| 2 | $-C_3H_7$ | Br | H | Z | 61.96 | none |
| 3 | $-C_4H_9$ | Br | H | $-C_2H_5$ | 6.98 | 88.5 |
| 4 | $-C_4H_9$ | Br | H | Z | 56.94 | 5.9 |
| 5 | $-C_5H_{11}$ | Br | H | $-C_2H_5$ | 2.7 | 95.6 |
| 6 | $-C_5H_{11}$ | Br | H | Z | 55.6 | 8.13 |

Variations in the activity of the compounds tested has been correlated to differences in molecular structure other than the substitution of the morpholino group for alkyl groups represented by the two $R^1$ groups but this variation or contrast is most interesting. These three morpholino compounds give no significant effect on intestinal activity but are effective stomach antispasmodics. Toxicologically these morpholino compounds give a longer lasting general systemic effect than their dialkylamino analogs. Their toxicity is markedly less than that of their dialkylamino analogs.

We claim:

1. As a new product, a compound of the formula

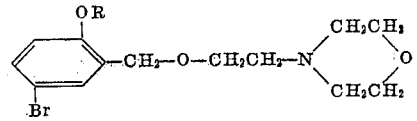

in which R is an alkyl group having from 4 to 5 carbon atoms.

2. A new product as defined in claim 1 in which R is a butyl group.

3. A new product as defined in claim 1 in which R is a pentyl group.

References Cited in the file of this patent
UNITED STATES PATENTS
2,766,238    Felton _____ Oct. 9, 1956